(No Model.)
J. CLASS.
SAW HANDLE.
No. 280,579. Patented July 3, 1883.
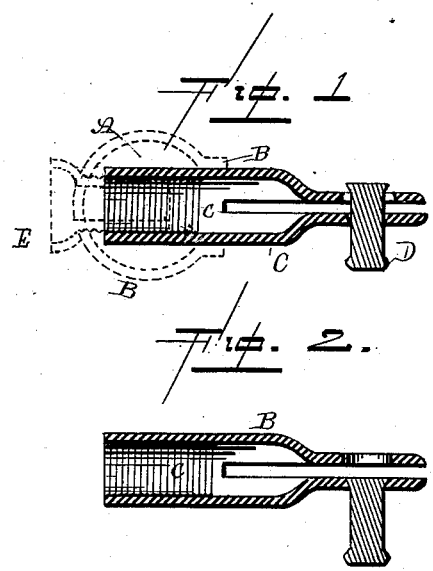

UNITED STATES PATENT OFFICE.

JOHN CLASS, OF CANTON, OHIO.

SAW-HANDLE.

SPECIFICATION forming part of Letters Patent No. 280,579, dated July 3, 1883.

Application filed February 28, 1883. (No model.)

*To all whom it may concern:*

Be it known that I, JOHN CLASS, of Canton, in the county of Stark and State of Ohio, have invented certain new and useful Improvements in Saw-Handles; and I do hereby declare the following to be a full, clear, and exact description of the invention, such as will enable others skilled in the art to which it pertains to make and use it, reference being had to the accompanying drawings, which form part of this specification.

My invention relates to an improvement in saw-handles; and it consists in the combination of a clamping-nut or stretching-rod, which secures the saw to the handle, with a rivet which is made to pass through both the nut or stretcher and the saw, and which rivet has one of its ends expanded or enlarged in such a manner that it cannot be drawn through one side of the nut or stretcher, as will be more fully described.

The object of my invention is to so attach the rivet which passes through both the nut and the saw to the nut that it can never become displaced and lost and cause trouble and delay by becoming misplaced.

Figure 1 is central longitudinal section of a device embodying my invention. Fig. 2 is a similar view, showing the rivet in another position.

A represents the saw-handle; B, a casting which is applied thereto, with suitable notches upon its inner side for the end of the saw to bear against. The nut or stretcher-rod C, which is internally screw-threaded at its inner end, is passed partially through the casting and handle from their inner side, and receives the inner end of the screw-bolt E, by means of which the nut or stretcher-rod is moved endwise for the purpose of drawing the end of the saw tightly against the casting or releasing it therefrom. The inner end of this nut or stretcher is flattened out so as to be considerably wider than at its screw-threaded end, and has a suitable recess made in it to receive the end of the saw-blade. Through one prong or jaw is drilled a large hole, which is continued in a part of the way through the opposite jaw or prong to form a depression or countersink, into which the large end of the rivet D drops when the saw is to be attached to or removed from the handle. From the bottom of the countersink a smaller hole is continued through the jaw, and which smaller hole is too small to pass the enlarged end of the rivet which is to be passed through the end of the saw for the purpose of connecting the saw to the stretcher-rod or nut. While the rivet is pushed inward so as to pass through both the saw and the nut, the friction of the rivet against both the nut and the saw serves to hold the rivet rigidly in place. As soon as the tension upon the nut is relaxed, the rivet can be freely pushed endwise until its enlarged end sinks into the countersink, and thus allows the saw to be freely withdrawn. The outer head of this rivet will be preferably formed like the head of a wood-screw, so that it can be freely taken hold of by the fingers, and thus moved into any desired position, while the inner end will be upset, expanded, or otherwise enlarged in such a manner that it cannot be made to pass through the small hole beyond the countersink.

The great trouble experienced in the use of rivets and other fastening devices for connecting the saw to the clamping-nut or stretcher-rod has been their liability to become detached and dropped upon the ground. If the saw is being used in the top of a new building, or in the woods where the leaves are thick, or there is snow upon the ground, it is almost impossible to find the rivets afterward, and unless the workman happens to have another in his pocket, the saw is disabled for the time being, and thus much time is lost. The object of my invention is to overcome this defect, and to so construct the parts that they may be permanently attached together and always in position ready to be used.

Having thus described my invention, I claim—

In a saw-handle, the combination of a suitable stretcher-rod or nut, with a rivet which is to be passed through both the saw and the nut, and which rivet has one of its ends enlarged in such a manner that it cannot become detached from the nut, substantially as shown and described.

In testimony whereof I affix my signature in presence of two witnesses.

JOHN CLASS.

Witnesses:
JOSEPH J. PARKER,
J. T. BROWN.